(12) United States Patent
Hatakeyama et al.

(10) Patent No.: US 11,131,779 B2
(45) Date of Patent: Sep. 28, 2021

(54) RADIATION MONITOR (71) Applicant: HITACHI, LTD., Tokyo (JP)

(72) Inventors: Shuichi Hatakeyama, Tokyo (JP); Takahiro Tadokoro, Tokyo (JP); Yuichiro Ueno, Tokyo (JP); Yasushi Nagumo, Tokyo (JP); Katsunori Ueno, Tokyo (JP); Kouichi Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 189 days.

(21) Appl. No.: 16/474,111

(22) PCT Filed: Jan. 30, 2018

(86) PCT No.: PCT/JP2018/003006
§ 371 (c)(1),
(2) Date: Jun. 27, 2019

(87) PCT Pub. No.: WO2018/179797
PCT Pub. Date: Oct. 4, 2018

(65) Prior Publication Data
US 2019/0353804 A1 Nov. 21, 2019

(30) Foreign Application Priority Data
Mar. 31, 2017 (JP) .............................. JP2017-071977

(51) Int. Cl.
G01T 1/20 (2006.01)
C09K 11/77 (2006.01)
G01T 1/202 (2006.01)

(52) U.S. Cl.
CPC ............ *G01T 1/2006* (2013.01); *C09K 11/77* (2013.01); *C09K 11/7715* (2013.01);
(Continued)

(58) Field of Classification Search
None
See application file for complete search history.

(56) References Cited

U.S. PATENT DOCUMENTS 4,421,671 A * 12/1983 Cusano ................. C04B 35/505
250/483.1
2003/0025084 A1 2/2003 Honda et al.
(Continued)

FOREIGN PATENT DOCUMENTS

JP 2003-50280 A 2/2003
JP 2008-231185 A 10/2008
(Continued)

OTHER PUBLICATIONS

International Preliminary Report on Patentability received in corresponding International Application No. PCT/JP2018/003006 dated Oct. 10, 2019.
(Continued)

*Primary Examiner* — David P Porta
*Assistant Examiner* — Carolyn Fin
(74) *Attorney, Agent, or Firm* — Mattingly & Malur, PC (57) ABSTRACT The present invention includes: a radiation detecting unit including a fluorescent body expressed by the formula $ATaO_4$: B, C (in the formula, A is selected from at least one kind of element from among rare-earth elements involving 4f-4f transitions, B is selected from at least one kind of element, different from A, from among rare-earth elements involving 4f-4f transitions, and C is selected from at least one kind of element from among rare-earth elements involving 5d-4f transitions); an optical fiber that transmits photons generated by the fluorescent body; a light detector that
(Continued)

converts the photons transmitted via the optical fiber 3 one by one into electrical pulse signals; a counter that counts the number of electrical pulse signals converted by the light detector; an analysis and display device 6 that obtains a radiation dose rate on the basis of the number of electrical pulse signals counted by the counter.

11 Claims, 6 Drawing Sheets

(52) U.S. Cl.
CPC ...... *C09K 11/7728* (2013.01); *C09K 11/7743* (2013.01); *C09K 11/7756* (2013.01); *C09K 11/7759* (2013.01); *C09K 11/7766* (2013.01); *C09K 11/7769* (2013.01); *C09K 11/7783* (2013.01); *C09K 11/7787* (2013.01); *G01T 1/2012* (2013.01); *G01T 1/2018* (2013.01); *G01T 1/2023* (2013.01)

(56) References Cited

U.S. PATENT DOCUMENTS

| | | | |
|---|---|---|---|
| 2010/0200758 A1 | 8/2010 | Fukuda et al. | |
| 2015/0185337 A1* | 7/2015 | Kawanishi | C09K 11/06 250/367 |
| 2017/0315241 A1 | 11/2017 | Tadokoro et al. | |
| 2018/0011203 A1* | 1/2018 | Katayama | G01T 1/167 |

FOREIGN PATENT DOCUMENTS

| | | |
|---|---|---|
| JP | 2010-181373 A | 8/2010 |
| JP | 2016-114392 A | 6/2016 |

OTHER PUBLICATIONS

International Search Report of PCT/JP2018/003006 dated Mar. 13, 2019.

\* cited by examiner

RADIATION MONITOR

TECHNICAL FIELD

The present invention relates to a radiation monitor using an optical fiber.

BACKGROUND ART

As an example of a radiation monitor that can suppress the risk of explosion or the like and that can measure a dose rate of a radiation easily and accurately, Patent Document 1 discloses a radiation monitor including a radiation emitting element that includes a light emitting section emitting light at an intensity corresponding to a dose rate of an incident radiation, an optical fiber that is connected to the radiation emitting element and that transfers the light emitted from the light emitting section, an electric pulse converter that is connected to the optical fiber and that sends one electric pulse for one photon in the transmitted light, an electric pulse detector that is connected to the electric pulse converter and that counts the electric pulses sent from the electric pulse converter, and an analyzer that is connected to the electric pulse detector and that converts an electric pulse count rate obtained by the electric pulse detector into a radiation dose rate.

Furthermore, with a view to providing a scintillator composition and a method of manufacturing a scintillator composition, Patent Document 2 discloses a scintillator composition consisting of a compound represented by $ATaO_4$ (where A is one to five elements selected from among lanthanoid elements, Sc, and Y).

PRIOR ART DOCUMENT

Patent Documents

Patent Document 1: JP-2016-114392-A
Patent Document 2: JP-2008-231185-A

SUMMARY OF THE INVENTION

Problem to be Solved by the Invention

As a radiation monitor measuring the radiation dose rate, an ionization chamber, a GM counter (Geiger-Müller counter), a scintillation detector, and a semiconductor detector are used. The semiconductor detector is applied particularly as the radiation monitor capable of measuring the radiation dose rate in a low dose rate environment.

Radiation monitors using the semiconductor detectors are utilized in, for example, nuclear power plants, nuclear fuel reprocessing facilities, medical facilities and industrial facilities using radioactive isotopes, research accelerator facilities, and general environmental monitoring apparatuses. The radiation monitor using the semiconductor detector derives a dose rate from a counting rate of electric pulses produced by a voltage applied to a semiconductor while making use of electron-hole pairs produced by the incident radiation.

On the other hand, it is necessary to apply a high voltage to the semiconductor detector; thus, using the semiconductor detector possibly involves the risk of explosion in a case of a high hydrogen concentration in the air. Moreover, utilization of the electric pulse signals generated from the semiconductor possibly causes electrical noise to be sent to other measurement instruments and electrical noise to be received from the other measurement instruments.

As a detector capable of explosion protection and suppression of electrical noise, there is known an optical fiber-type radiation monitor, which is, for example, a technique disclosed in Patent Document 1 described above. A plurality of photons produced for the incident radiation is transferred by the optical fiber and the dose rate is measured by the optical fiber-type radiation detector; thus, the optical fiber type radiation detector can dispense with feeding power to the radiation detection section and suppress sending and reception of the electrical noise.

The inventors of the present invention proposed forming the light emitting section that emits light at the intensity corresponding to the dose rate of the incident radiation from, for example, a light transmission material such as transparent yttrium aluminum garnet (a garnet structure crystal made up of a complex oxide of yttrium and aluminum ($Y_3Al_5O_{12}$)) and a rare-earth element such as ytterbium (Yb), neodymium (Nd), cerium (Ce), or praseodymium (Pr) contained in this light transmission material. However, further improvement in detection sensitivity of the radiation monitor using the optical fiber has been desired to ensure measuring performance in the low dose rate environment in which the counting rate of the incident radiation falls.

Generally, it is desirable to apply a high-density scintillator crystal to improve radiation detection efficiency. As the high-density scintillator crystal, there is known a tantalate (density: 7 to 9 $g/cm^3$) (refer to, for example, Patent Document 2).

However, a conventional technique using the high-density tantalate and disclosed in Patent Document 2 generally has a problem of afterglow. A detector using the light-emitting section detects light emitted at a time of recombination of electron-hole pairs produced by the incident radiation. Here, the afterglow results from the fact that electrons produced and excited to a conduction band are trapped by a metastable state, lattice defects, and impurities, and then the trapped electrons are excited again to the conduction band after passage of certain time and recombined with holes by radiative transitions. The influence of the afterglow causes a problem of a reduction in dose rate measurement accuracy. It is generally difficult to obtain sufficient statistical accuracy particularly in the low dose rate environment since the counting rate falls in the environment. The reduction in the measurement accuracy caused by this afterglow entails an increase in measurement errors in the low dose rate environment, resulting in a problem that it is difficult to apply the tantalate crystal to a radiation detection section.

Moreover, the afterglow increases with a temperature increase of the scintillator crystal. This is because an increase in a probability that electrons in the metastable state, those with lattice defects, and those trapped by impurities are excited to the conduction band by heat and electrons are recombined with holes by radiative transitions. The afterglow is more conspicuous with the temperature increase; thus, in a case of applying the tantalate crystal to the radiation detection section and measuring the dose rate in an environment at a temperature equal to or higher than room temperature, the reduction in the dose rate measurement accuracy disadvantageously occurs. In this way, the conventional techniques described above have the problems of the reduction in the dose rate measurement accuracy due to the influence of the afterglow and the reduction in heat resistance.

An object of the present invention is to provide a radiation monitor using an optical fiber and capable of improving dose rate measurement accuracy from that according to conventional techniques.

Means for Solving the Problems

While the present invention includes a plurality of means for solving the problems, an example of the means is a radiation monitor that measures a dose rate of a radiation and that is equipped with a radiation detection section that has a phosphor represented $ATaO_4$:B,C (in Formula (1), A is selected from among at least one or more elements in a rare-earth element group with 4f-4f transitions, B is selected from among at least one or more elements other than A in the rare-earth element group with the 4f-4f transitions, and C is selected from among at least one or more elements in a rare-earth group with 5d-4f transitions); an optical fiber that transfers a photon produced in the phosphor; a photo detector that converts the photon transferred by the optical fiber into an electric pulse signal; a counter that counts the number of a plurality of the electric pulse signals into which the photo detector converts a plurality of the photons; and an analysis section that obtains a radiation dose rate on a basis of a count of the electric pulse signals by the counter and using a relationship between a counting rate of single photons and a radiation dose rate.

The other aspects of the present invention will be described in the embodiments described later.

Advantages of the Invention

According to the present invention, it is possible to improve the dose rate measurement accuracy of the radiation monitor using the optical fiber from that according to the conventional techniques.

MODES FOR CARRYING OUT THE INVENTION

Embodiments of a radiation monitor according to the present invention will be described with reference to the drawings.

First Embodiment

Figure 1:
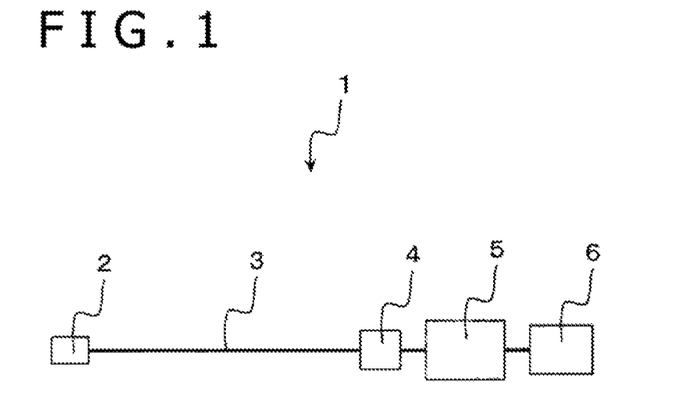
FIG. 1 is a block diagram depicting a radiation monitor according to a first embodiment.
Figure 2:
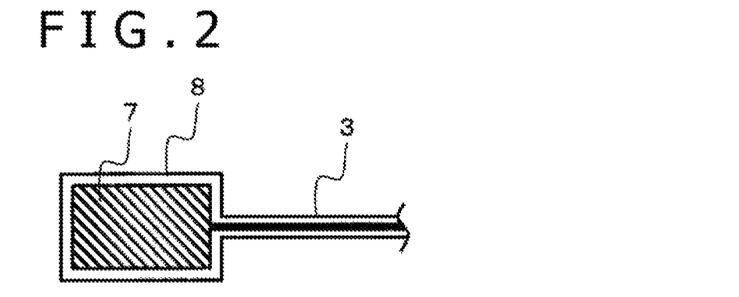
FIG. 2 is a schematic enlarged cross-sectional view of a radiation detection section in the radiation monitor of FIG. 1.

A first embodiment of a radiation monitor according to the present invention will be described with reference to FIGS. 1 to 10. An overall configuration of the radiation monitor will first be described with reference to FIGS. 1 and 2. FIG. 1 is a block diagram depicting a radiation monitor 1 according to the present embodiment. FIG. 2 is a schematic enlarged cross-sectional view of a radiation detection section 2 in the radiation monitor 1 of FIG. 1.

The radiation monitor 1 measures a dose rate, and is schematically configured with a radiation detection section 2, an optical fiber 3, a photo detector 4, a counter 5, and an analyzer/display device 6, as depicted in FIG. 1. Examples of radiations that can be measured by the radiation monitor 1 include electromagnetic waves such as an X-ray and a γ-ray and particle beams such as an α-ray, a β-ray, and a neutron ray.

As depicted in FIG. 2, the radiation detection section 2 is an element having a phosphor 7 that emits light at an intensity corresponding to a dose rate of an incident radiation, and a housing 8. In other words, in the present embodiment, the radiation monitor 1 has a light-emitting section (for example, the phosphor 7) accommodated in the housing 8.

A composition of the phosphor 7 is represented by the following General Formula (1).

$$ATaO_4:B,C \quad (1)$$

In Formula (1), A is selected from among at least one or more elements in a rare-earth element group with 4f-4f transitions. A is preferably selected from among at least one or more elements including praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb).

In Formula (1), B is an element different from A and selected from among at least one or more elements in the rare-earth group involving 4f-4f transitions. B is preferably an element different from A and selected from among at least one or more elements including praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb).

A concentration of the additive B to be contained in the phosphor 7 is within a range of preferably $1 \times 10^{-3}$ to 30 mass %, more preferably 0.1 to 10 mass % of a total mass of the composite represented by General Formula (1). It is thereby possible to more reliably obtain a high emission intensity by the additive B.

In Formula (1), C is selected from among at least one or more elements in a rare-earth group with 5d-4f transitions. C is preferably selected from among at least one or more elements including cerium (Ce), praseodymium (Pr), neodymium (Nd), and terbium (Tb). When Pr, Nd, and Tb are selected as A or B, C is desirably selected from among at least one or more elements including the elements that are not selected.

A concentration of the additive C to be contained in the phosphor 7 is within a range of preferably $1 \times 10^{-6}$ to 30 mass %, more preferably 0.01 to 10 mass % of the total mass of the composite represented by General Formula (1). It is thereby possible to further reduce afterglow resulting from the additive B.

A method of manufacturing the phosphor 7 is not limited to a specific manufacturing method as long as the method can grow the composite represented by General Formula (1) and, for example, the floating zone method, the Czochralski method (pulling-up method), the micro-pulling-down method, the Bridgman method, or the Verneuil method can be adopted as the manufacturing method.

The phosphor 7 contains $ATaO_4$, which is a high-density base material, and the additive B contains at least one or more rare-earth elements with 4f-4f transitions as described above, thereby making use of energy imparted to the base material by the incident radiation for excitation energy of the additive B with high efficiency. Therefore, by using the high-density base material, $ATaO_4$ can improve absorption efficiency of the base material for absorbing the radiation, the base material A and the additive B, which is an activator, can enhance luminous efficiency of light at 500 to 700 nm for which the optical fiber 3 exhibits high transmission efficiency, and detection sensitivity can be improved.

For the rare-earth elements A, B, and C to be contained in the phosphor 7, the ionic valences of the elements are not limited to the specific ones as long as those are available for light emission and, for example, bivalent, trivalent and tetravalent can be adopted.

Furthermore, the rare-earth element with 5d-4f transitions has fluorescence lifetime $10^5$ shorter than that with 4f-4f transitions. In the present embodiment, the phosphor 7 contains at least one or more rare-earth elements with 5d-4f transitions as the additive C. As described above, a certain proportion of electrons among the electrons produced by the radiation incident on the phosphor 7 are trapped by defects in a crystal and impurities. However, the rare-earth element with 5d-4f transitions has the shorter fluorescence lifetime than that of the rare-earth element with 4f-4f transitions; thus, the trapped electrons are promptly excited to the conduction band again and recombined with holes by radiative transitions. It is thereby possible to reduce the number of electrons that cause the afterglow resulting from the additive B, to efficiently reduce the afterglow resulting from the additive B, and to improve the dose rate measurement accuracy.

Moreover, the 5d-4f transition of the additive C indicates either a radiationless transition involving emission of thermal energy without involving light emission or a radiative transition involving light emission. Generally, light emission by the radiative transitions of the additive C has an emission wavelength equal to or smaller than 500 nm.

Here, the afterglow resulting from the additive B with 4f-4f transitions increases with a temperature increase of the phosphor 7. This is because the electrons trapped by the metastable state, lattice defects, and impurities are excited by heat and recombination probability of electron and hole by the radiative transitions increases. Owing to this, using the element with 5d-4f transitions shorter in fluorescence lifetime than the element with 4f-4f transitions as the additive C enables electrons trapped by the metastable state, lattice defects, and impurities to be used in recombination with holes with high efficiency. It is thereby possible to reduce the number of electrons trapped by the metastable state, lattice defects, and impurities that may cause the afterglow resulting from the additive B with the temperature increase of the phosphor 7; thus, it is possible to efficiently reduce the afterglow even at a high temperature and to improve the heat resistance of the phosphor 7. This is effective particularly in a case of measuring a dose rate in an environment at a temperature equal to or higher than room temperature and it is possible to improve the dose rate measurement accuracy in the high-temperature environment.

In other words, containing the rare-earth element with 4f-4f transitions in each of the base material A and the additive B and containing the rare-earth element with 5d-4f transitions in the additive C make it possible to exhibit the following advantages.

(1) It is possible to efficiently reduce the afterglow resulting from the additive B and to improve the dose rate measurement accuracy.

(2) It is possible to improve the heat resistance of the phosphor 7 and to improve the dose rate measurement accuracy in the high-temperature environment by efficient reduction of the afterglow with the temperature increase of the phosphor 7.

Since the phosphor 7 has a damping time constant equal to or higher than 1 μs, it is possible to decompose a collection of single photons transferred by the optical fiber 3 into single photons. It is noted that the phosphor 7 having a damping time constant lower than 1 μs can be also used.

The housing 8 is a container that accommodates the phosphor 7. A material configuring the housing 8 is not limited to a specific one as long as the material can transmit a radiation to be measured and, for example, aluminum can be adopted as the material.

With reference back to FIG. 1, the optical fiber 3 is connected to the radiation detection section 2 and transfers the light emitted from the phosphor 7. This optical fiber 3 is connected to the radiation detection section 2 and the photo detector 4 to be described later. Examples of a material configuring the optical fiber 3 include quartz and plastic.

The photo detector 4 is a detector that is connected to the optical fiber 3 and that converts each of photons transferred by the optical fiber 3 into an electric pulse signal. This photo detector 4 is connected to the optical fiber 3 and the counter 5 to be described later. As the photo detector 4, a photomultiplier or an avalanche photodiode, for example, can be adopted. Using the photomultiplier or the like makes it possible to detect a single photon as one current pulse signal having been subjected to current amplification.

The counter 5 is a device that is connected to the photo detector 4 and that counts electric pulse signals input from the photo detector 4. This counter 5 is connected to the photo detector 4 and the analyzer/display device 6 to be described later. As the counter 5, a digital signal processor, for example, can be adopted.

The analyzer/display device 6 is a device that is connected to the counter 5, that converts a counting rate of the electric pulse signals counted by the counter 5 into a radiation dose rate, and that displays a resultant value. The analyzer/display device 6 is equipped with a storage device that holds a database in which the counting rate of electric pulse signals of single photons is made to correspond to the radiation dose rate, a computing device that converts the counting rate of the electric pulse signals into the radiation dose rate using the database, and a display device that displays the radiation dose rate obtained by conversion. As the analyzer/display device 6, a personal computer having functions described above, for example, can be adopted. In the present specification, the "counting rate of electric pulse signals" means the number of electric pulse signals measured per unit time.

Unlike a conventional scheme for converting a counting rate of γ-rays into the radiation dose rate, the counting rate of single photons included in a plurality of photons produced by the phosphor 7 by incidence of γ-rays is converted into the radiation dose rate according to the present invention. In the present specification, the "single photon" refers to each photon produced within the phosphor 7 by recombination of electron-hole pairs produced by the incident radiation.

Figure 3:
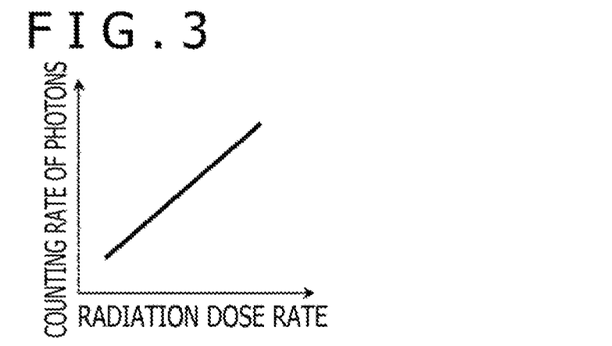
FIG. 3 is a schematic diagram depicting an example of a relationship between a radiation dose rate and a counting rate of single photons.

FIG. 3 is a schematic diagram depicting an example of a relationship between the radiation dose rate and the counting rate of single photons. As depicted in FIG. 3, the radiation dose rate can be acquired if the counting rate of the single photons can be measured. Therefore, using this relationship makes it possible to convert the counting rate of measured electric pulse signals into the radiation dose rate.

An operation performed by the radiation monitor 1 according to the present embodiment will next be described.

Figure 4:
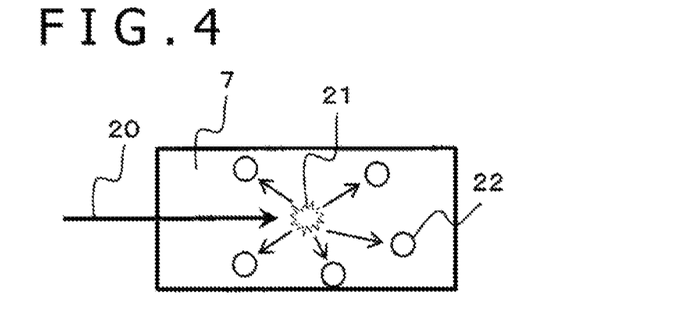
FIG. 4 is a schematic diagram depicting an example of production of light at a time of incidence of a radiation on a phosphor.

FIG. 4 is a schematic diagram depicting an example of production of light at a time of incidence of a radiation 20 on the phosphor 7. In FIG. 4, when the radiation 20 is incident on the phosphor 7, an interaction 21 occurs. Following this interaction 21, a plurality of single photons 22 are produced.

Figure 5:
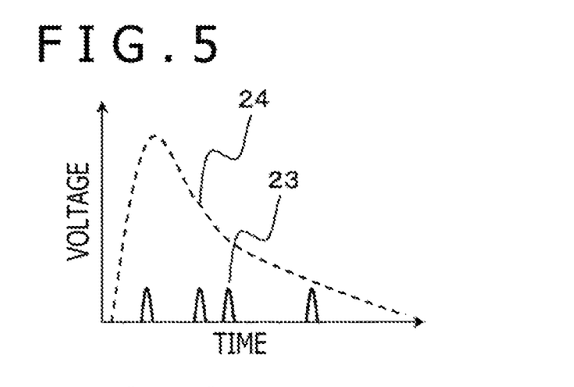
FIG. 5 is a schematic diagram depicting an example of an electric pulse signal in a case of assuming that outputs from a photo detector have been measured.

FIG. 5 is a schematic diagram depicting an example of electric pulse signals 23 in a case of assuming that outputs from the photo detector have been measured. Typically, when one radiation 20 is incident on the phosphor 7, then a plurality of, that is, many single photons 22 are produced and measured as one electric pulse signal 24 depicted in FIG. 5. In the present embodiment, the phosphor 7 contains, as the additive B, the element selected from among the rare-earth group with 4f-4f transitions involving relatively long fluorescence lifetime; thus, the single photons 22 are produced without being lumped. Owing to this, the single photons 22 transferred by the optical fiber 3 can be measured one by one by the photo detector 4. As depicted in FIG. 5, the photo detector 4 measures the single photon 22 as the electric pulse signal 23 having a time width of approximately 2 ns.

Figure 6:
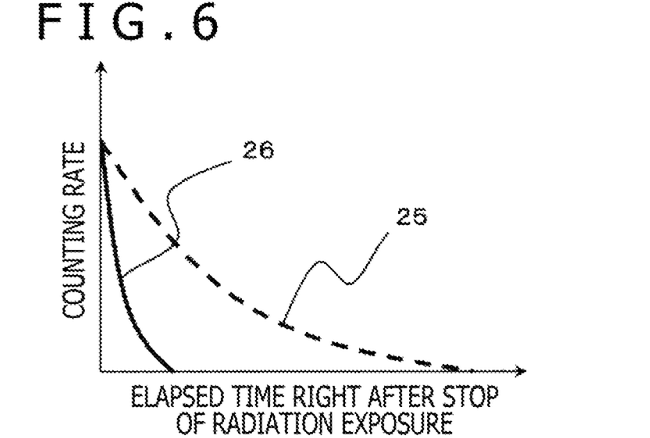
FIG. 6 is a schematic diagram depicting an example of relationships between elapsed time after stop of radiation exposure and counting rates in the radiation monitor according to the first embodiment and a conventional radiation monitor.

FIG. 6 is a schematic diagram depicting an example of relationships between elapsed time after stop of radiation exposure and counting rates. Typically, in a case of irradiating a phosphor with 4f-4f transitions with a radiation at a predetermined cumulative dose and measuring a counting rate right after stop of radiation exposure, the counting rate gently falls over time and a long damping time constant is observed as indicated by afterglow characteristics 25 in FIG. 6. On the other hand, in a case of measuring the counting rate right after stop of radiation exposure using the phosphor 7 of the present embodiment represented by General Formula (1), electrons trapped by defects in a crystal and impurities are used in recombination with holes produced by the radiation incident on the element with 5d-4f transitions with high efficiency; thus, the counting rate promptly damps as indicated by afterglow characteristics 26 in FIG. 6. Owing to this, it is possible to reduce the afterglow and to realize shortening of the damping time constant. In the present specification, the "predetermined cumulative dose" represents a total radiation dose obtained by multiplying the dose rate of the radiation by radiation exposure time.

Figure 7:
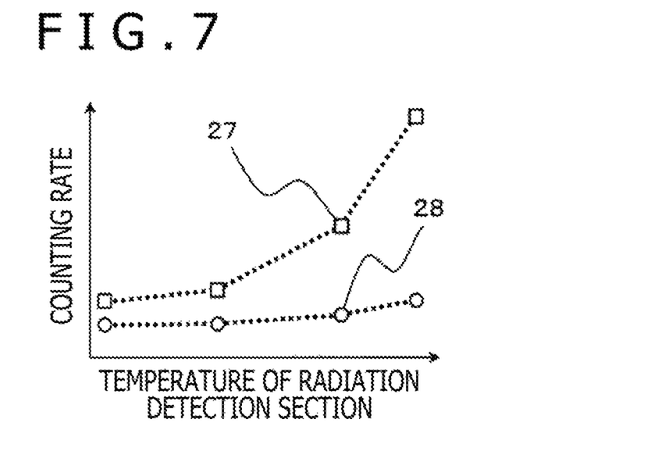
FIG. 7 is a schematic diagram depicting an example of counting rate measurement results for a temperature of the radiation detection section in the radiation monitor according to the first embodiment and the conventional radiation monitor.

FIG. 7 is a schematic diagram depicting an example of counting rate measurement results for a temperature of the radiation detection section 2. Typically, afterglow of the phosphor with 4f-4f transitions increases with an increase in the temperature of the radiation detection section as indicated by heat resistance 27 in FIG. 7. Owing to this, the counting rate of single photons produced by the incident radiation increases with the temperature increase of the radiation detection section due to the influence of the afterglow. On the other hand, in the case of the phosphor 7 containing the additive C with 5d-4f transitions according to the present embodiment, the afterglow accompanying the temperature increase can be reduced efficiently and it is, therefore, possible to reduce an increase in the counting rate as indicated by heat resistance 28 in FIG. 7.

In this way, the phosphor 7 of the radiation monitor 1 includes the high-density base material $ATaO_4$ represented by General Formula (1), each of A and B is caused to contain at least one or more rare-earth elements with 4f-4f transitions, and further the additive C is caused to contain at least one or more rare-earth elements with 5d-4f transitions, thus the radiation monitor 1 can efficiently reduce the afterglow resulting from the additive B in the phosphor 7 and measures the counting rate of the single photons 22 transferred by the optical fiber 3, enabling improvement of the radiation dose rate measurement accuracy. Furthermore, the radiation monitor 1 can efficiently reduce the afterglow resulting from the additive B accompanying the temperature increase using the additive C in the phosphor 7 and measure the counting rate of the single photons 22 transferred by the optical fiber 3 with high accuracy. It is, therefore, possible to improve the measurement accuracy of measuring the radiation dose rate in the high-temperature environment.

Preferable usage examples of the radiation monitor 1 will next be described with reference to FIGS. 8 to 10.

Figure 8:
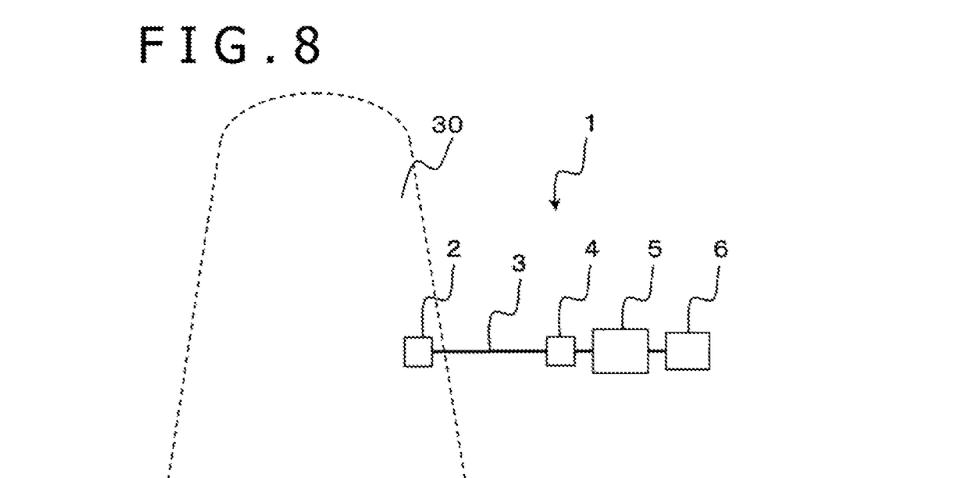
FIG. 8 is a schematic diagram depicting a usage example of the radiation monitor of FIG. 1.

FIG. 8 is a schematic diagram depicting a usage example of the radiation monitor of FIG. 1. As depicted in FIG. 8, out of the constituent elements of the radiation monitor 1, the radiation detection section 2 is installed inside of an area to be measured 30, and the photo detector 4, the counter 5, and the analyzer/display device 6 are installed outside of the area to be measured 30. The radiation detection section 2 and the photo detector 4 are connected to each other by the optical fiber 3. It is thereby possible to measure the radiation dose rate with high accuracy in the high-temperature environment in which the temperature is equal to or higher than room temperature inside a nuclear reactor building or a reactor container.

Figure 9:
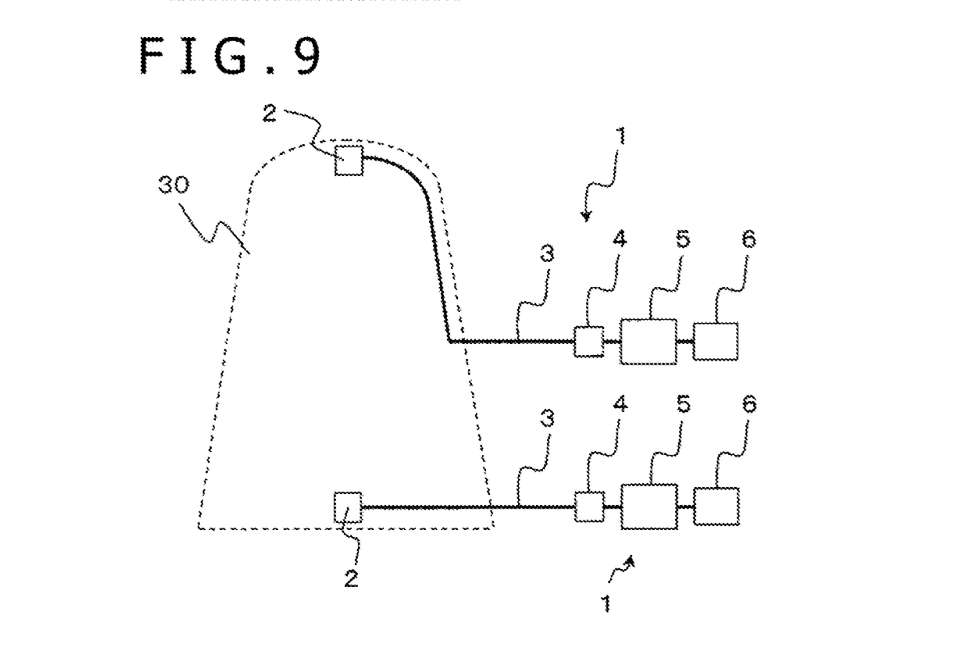
FIG. 9 is a schematic diagram depicting another usage example of the radiation monitor of FIG. 1.

FIG. 9 is a schematic diagram depicting another usage example of the radiation monitor of FIG. 1. As depicted in FIG. 9, two radiation monitors 1 are prepared and the radiation detection sections 2 are installed at different locations in the area to be measured 30, thereby making it possible to measure a dose rate distribution in the area to be measured 30 with high accuracy. Taking these advantages into consideration, it is possible to apply the radiation monitor according to the present embodiment in the environment in which the temperature is equal to or higher than room temperature at a nuclear power plant, a nuclear fuel reprocessing facility, a medical facility or an industrial facility using radioactive isotopes, a research accelerator facility, a general environmental monitoring apparatus, or the like. It is noted that the number of radiation monitors 1 to be prepared is not limited to two but may be three or more.

Figure 10:
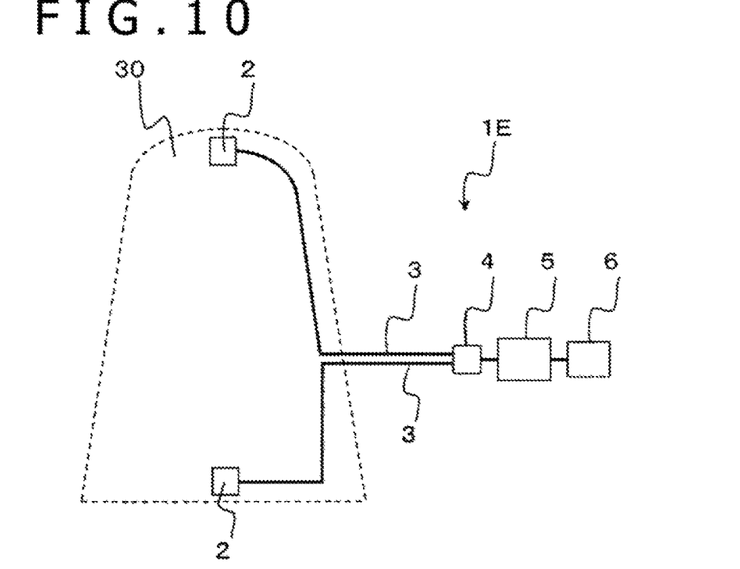
FIG. 10 is a schematic diagram depicting another usage example of the radiation monitor of FIG. 1.

FIG. 10 is a schematic diagram depicting yet another usage example of the radiation monitor of FIG. 1. As depicted in FIG. 10, a radiation monitor 1E having two radiation detection section 2 is installed inside of the area to be measured 30, the radiation detection sections 2 are installed in different locations, and the constituent elements of the radiation monitor 1E including the photo detector 4 and the following elements are commonly used. Even with such a configuration, it is possible to measure the dose rate distribution in the area to be measured 30 with high accuracy. It is noted that the number of radiation detection sections 2 to be prepared is not limited to two but may be three or more.

Second Embodiment

A radiation monitor according to a second embodiment of the present invention will be described with reference to FIGS. 11 to 13. In the following second embodiment, the same configurations as those in the first embodiment are denoted by the same reference signs and only different parts will be described. In other words, the parts the description of which is omitted are similar to those in the first embodiment and the same thing is true for the subsequent embodiments.

Figure 11:
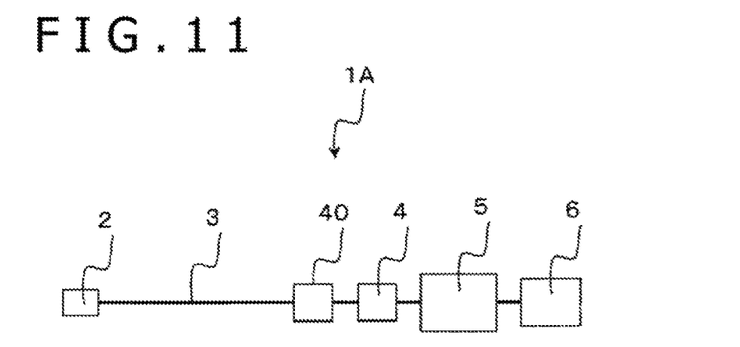
FIG. 11 is a schematic block diagram depicting a radiation monitor according to a second embodiment.

FIG. 11 is a schematic block diagram depicting a radiation monitor 1A according to the second embodiment. As depicted in FIG. 11, the radiation monitor 1A according to the present embodiment differs from the radiation monitor 1 according to the first embodiment in that the radiation monitor 1A has a wavelength filter 40.

The wavelength filter 40 is a device that is installed in a portion of the optical fiber 3 between the phosphor 7 of the radiation detection section 2 and the photo detector 4 and that transmits photons having wavelengths of a predetermined range out of photons transferred from the optical fiber 3. Providing a function to transmit the wavelengths of the predetermined range using the wavelength filter 40 as described above makes it possible to remove emission wavelengths other than that of the additive B produced in the phosphor 7.

The 5d-4f transition of the additive C indicates either the radiationless transition involving emission of thermal energy without involving light emission or the radiative transition involving light emission. Generally, light emission by 4f-4f transitions of the additive B has an emission wavelength equal to or larger than 500 nm and light emission by 5d-4f transitions of the additive C has an emission wavelength equal to or smaller than 500 nm; thus, it is desirable that the wavelength filter 40 transmits photons having wavelengths equal to or longer than 500 nm.

Applying the wavelength filter 40 having such characteristics makes it possible to discriminate the light emission by 4f-4f transitions of the additive B more accurately and to further improve the measurement accuracy of measuring the radiation dose rate. In the present specification, the "wavelengths of the predetermined range" indicate a wavelength range within which photons can be transmitted, and the photons are controlled by transmitting only the photons having specific wavelengths.

The photo detector 4 according to the present embodiment converts each of the photons transmitted through the wavelength filter 40 into an electric pulse signal.

The radiation monitor 1A according to the second embodiment of the present invention can attain substantially similar advantages to those of the radiation monitor 1 according to the first embodiment described above.

Furthermore, further providing the wavelength filter 40 makes it possible to eliminate the light emission by 5d-4f transitions of the additive C and to further improve the measurement accuracy of measuring the radiation dose rate.

Preferable usage examples of the radiation monitor 1A will next be described.

Figure 12:
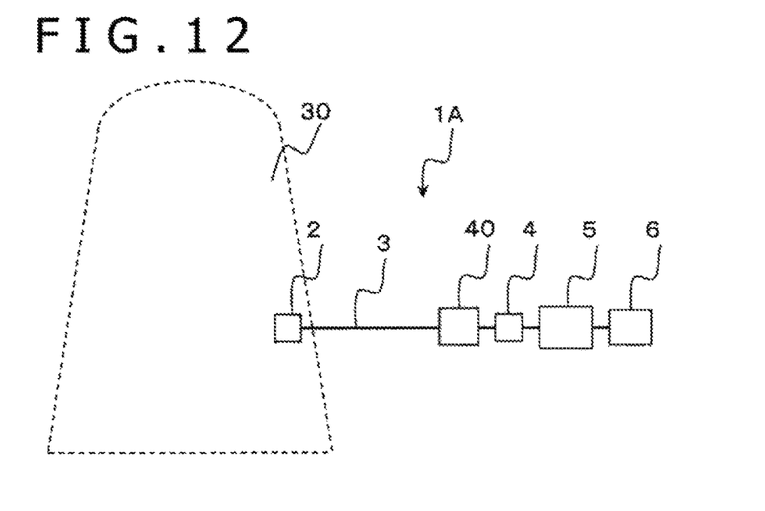
FIG. 12 is a schematic diagram depicting a usage example of the radiation monitor of FIG. 11.

FIG. 12 is a schematic diagram depicting a usage example of the radiation monitor of FIG. 11. As depicted in FIG. 12, out of the constituent elements of the radiation monitor 1A, the radiation detection section 2 is installed inside of the area to be measured 30, and the wavelength filter 40, the photo detector 4, the counter 5, and the analyzer/display device 6 connected to the optical fiber 3 are installed outside of the area to be measured 30. It is thereby possible to measure the radiation dose rate with high accuracy in the high-temperature environment in which the temperature is equal to or higher than room temperature inside a nuclear reactor building, or a reactor container.

Figure 13:
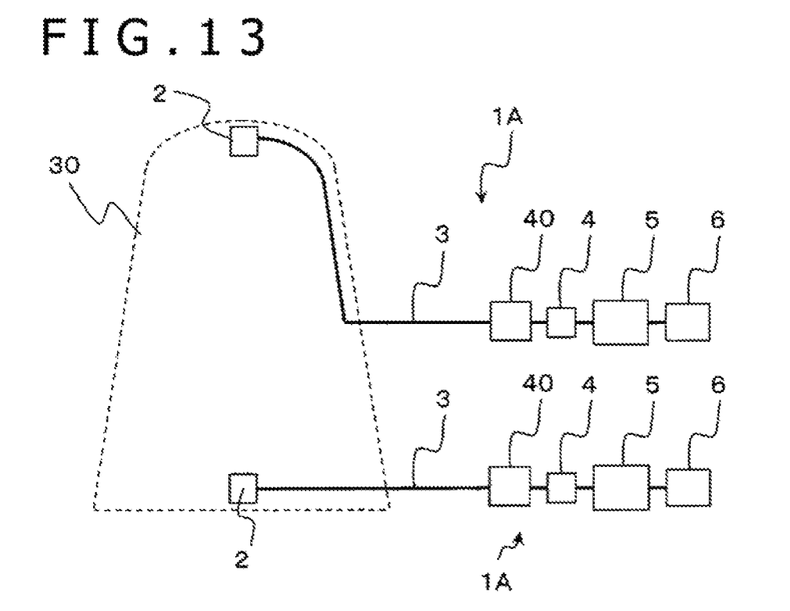
FIG. 13 is a schematic diagram depicting another usage example of the radiation monitor of FIG. 11.

FIG. 13 is a schematic diagram depicting another usage example of the radiation monitor of FIG. 11. As depicted in FIG. 13, two radiation monitors 1A are installed within the area to be measured 30, thereby making it possible to measure the dose rate distribution in the area to be measured 30 with high accuracy. Taking these advantages into consideration, it is possible to apply the radiation monitor (monitor and a measurement method) in the environment in which the temperature is equal to or higher than room temperature at a nuclear power plant, a nuclear fuel reprocessing facility, a medical facility or an industrial facility using radioactive isotopes, a research accelerator facility, general environmental monitoring apparatus or the like. It is noted that the number of radiation monitors 1A to be prepared is not limited to two but may be three or more.

Third Embodiment

A radiation monitor according to a third embodiment of the present invention will be described with reference to FIG. 14.

Figure 14:
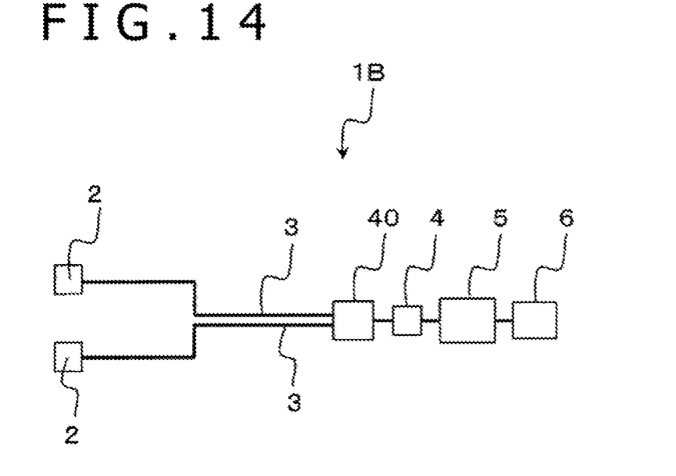
FIG. 14 is a schematic block diagram depicting a radiation monitor according to a third embodiment.

FIG. 14 is a schematic block diagram depicting a radiation monitor 1B according to the third embodiment. As depicted in FIG. 14, the radiation monitor 1B according to the present embodiment differs from the radiation monitor 1A according to the second embodiment in that the radiation monitor 1B has two radiation detection sections 2 and that two optical fibers 3 are connected to the same wavelength filter 40.

It is noted that the numbers of radiation detection sections 2 and the optical fibers 3 are not limited to two but may be three or more.

The radiation monitor 1B according to the third embodiment of the present invention also can attain substantially similar advantages to those of the radiation monitor 1A according to the second embodiment described above.

Furthermore, according to the present embodiment, a total number of the wavelength filter 40, the photo detector 4, the counter 5, and the analyzer/display device 6 of the radiation monitor 1B can be reduced, so that it is possible to realize a saving of an installation space, reductions in implementation and operational costs, reductions in the number of inspection items and the number of processes during maintenance, and a reduction in unevenness of the dose rate measurement accuracy due to the influence of an individual difference of the photo detector 4 that are due to miniaturization of the radiation monitor 1B.

Moreover, as the photo detector 4, a position sensitive photomultiplier or an avalanche photodiode, for example, can be adopted. It is thereby possible to identifiably measure the dose rates by the two or more radiation detection sections 2 from photon detected position information by the photo detector 4.

Fourth Embodiment

A radiation monitor according to a fourth embodiment of the present invention will be described with reference to FIG. 15.

Figure 15:
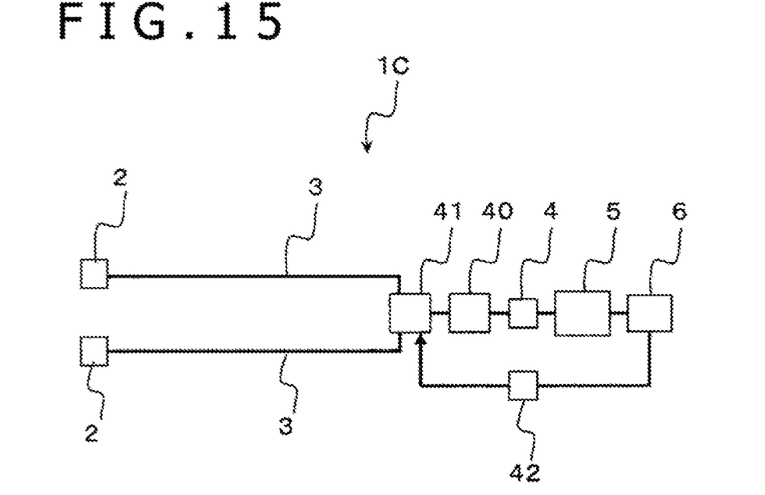
FIG. 15 is a schematic block diagram depicting a radiation monitor according to a fourth embodiment.

FIG. 15 is a schematic block diagram depicting a radiation monitor 1C according to the fourth embodiment. As depicted in FIG. 15, the radiation monitor 1C according to the present embodiment differs in that the radiation monitor 1C is further equipped with a photoselection mechanism 41 that selects what photons are to be transferred to the photo detector 4 from among photons transferred by the two optical fibers 3, and a control device 42 that is connected between the analyzer/display device 6 and the photoselection mechanism 41 and that executes control over the photoselection mechanism 41 to select what photons are to be transferred to the photo detector 4.

The photoselection mechanism 41 is a mechanism that selects an input from which of the two optical fibers 3 connected to the photoselection mechanism 41 is accepted. A structure and the like of this photoselection mechanism 41 are not limited to specific ones as long as the photoselection mechanism 41 can select one of the two optical fibers 3 and, for example, an optical switch, an optical coupler, or an optical splitter can be adopted as the photoselection mechanism 41. It is noted that the optical fiber 3 can be selected from three or more optical fibers 3.

The control device 42 is a device that is connected to the analyzer/display device 6 and the photoselection mechanism 41, that determines whether the analyzer/display device 6 is finished with measurement, and that controls the photoselection mechanism 41 in response to a determination result. In a case in which the analyzer/display device 6 is finished with the measurement, the control device 42 drives the photoselection mechanism 41 to change the optical fiber 3 to be selected. It is noted that the optical fiber can be selected from three or more optical fibers.

The radiation monitor 1C according to the fourth embodiment of the present invention can attain substantially similar advantages to those of the radiation monitor 1B according to the third embodiment described above.

Furthermore, according to the present embodiment, the total number of the wavelength filter 40, the photo detector 4, the counter 5, and the analyzer/display device 6 of the radiation monitor 1C can be reduced, so that it is possible to realize the saving of the installation space, the reductions in implementation and operational costs, the reductions in the number of inspection items and the number of processes during maintenance, and the reduction in unevenness of the dose rate measurement accuracy due to the influence of the individual difference of the photo detector 4 that are due to miniaturization of the radiation monitor 1C.

Moreover, it is possible to automate the measurement of all of the two or more radiation detection sections 2 and to greatly reduce labor and time required for the measurement.

Fifth Embodiment

A radiation monitor according to a fifth embodiment of the present invention will be described with reference to FIG. 16.

Figure 16:
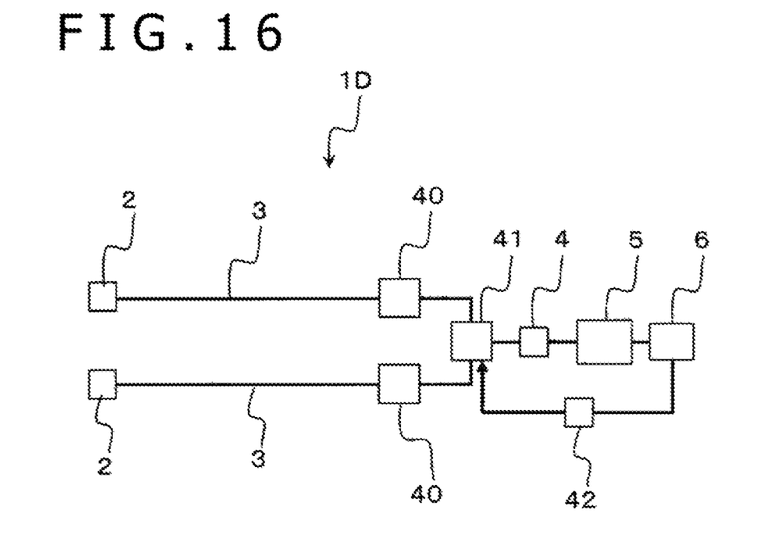
FIG. 16 is a schematic block diagram depicting a radiation monitor according to a fifth embodiment.

FIG. 16 is a schematic block diagram depicting a radiation monitor 1D according to the fifth embodiment. As depicted in FIG. 16, the radiation monitor 1D according to the fifth embodiment differs in that the radiation monitor 1D is further equipped with wavelength filters 40 each connected between each of the optical fibers 3 and the photoselection mechanism 41 and each transmitting photons having wavelengths of a predetermined range out of the photons transferred by each of the optical fibers 3.

Each wavelength filter 40 is connected between each of the optical fibers 3 and the photoselection mechanism 41, and the photoselection mechanism 41 can select one of the wavelength filters 40 corresponding to the wavelengths of the photons among the photons transferred from the radiation detection sections 2.

The radiation monitor 1D according to the fifth embodiment of the present invention can attain substantially similar advantages to those of the radiation monitor 1C according to the fourth embodiment described above.

Furthermore, according to the present embodiment, the total number of the photo detector 4, the counter 5, and the analyzer/display device 6 of the radiation monitor 1D can be reduced, so that it is possible to realize the saving of the installation space, the reductions in implementation and operational costs, the reductions in the number of inspection items and the number of processes during maintenance, and the reduction in unevenness of the dose rate measurement accuracy due to the influence of the individual difference of the photo detector 4 that are due to miniaturization of the radiation monitor 1D. Moreover, it is possible to automate the measurement of all of the two or more radiation detection sections 2 and to greatly reduce labor and time required for the measurement. Further, connecting the wavelength filter 40 to each of the optical fibers 3 makes it possible to apply the optimum radiation detection section 2 depending on each of a plurality of different environments to be measured.

<Others>

It is noted that the present invention is not limited to the embodiments described above but encompasses various modifications. The above embodiments have been described in detail so that the present invention is easy to understand, and the present invention is not always limited to one having all the described configurations. In addition, the configuration of the certain embodiment can be partially replaced by the configuration of the other embodiment or the configuration of the other embodiment can be added to the configuration of the certain embodiment. Furthermore, for a part of the configuration of each embodiment, addition, deletion, and/or replacement of the other configuration can be made.

REFERENCE SIGNS LIST

1, 1A, 1B, 1C, 1D, 1E: Radiation monitor
2: Radiation detection section
3: Optical fiber
4: Photo detector
5: Counter
6: Analyzer/display device (analysis section)
7: Phosphor
8: Housing
20: Radiation
21: Interaction
22: Single photon
23: Electric pulse signal
24: Electric pulse signal
25: Afterglow characteristics of phosphor (A TaO$_4$:B)

26: Afterglow characteristics of phosphor (A TaO$_4$:B,C)
27: Heat resistance of phosphor (A TaO$_4$:B)
28: Heat resistance of phosphor (A TaO$_4$:B,C)
30: Area to be measured
40: Wavelength filter
41: Light selection mechanism
42: Control device

The invention claimed is:

1. A radiation monitor for measuring a dose rate, comprising:
   a radiation detection section that has a phosphor;
   an optical fiber that transfers a photon produced in the phosphor;
   a photo detector that converts the photon transferred by the optical fiber into an electric pulse signal;
   a counter that counts the number of a plurality of the electric pulse signals which have been converted from a plurality of photons by the photo detector; and
   an analysis section having a computing device and a storage device and being configured to obtain a radiation dose rate on a basis of a count of the electric pulse signals by the counter and using a relationship between a counting rate of single photons and the radiation dose rate,
   wherein the phosphor is represented by a General Formula (1): ATaO$_4$:B,C,
   where A is selected from among at least one or more elements in a rare-earth element group with 4f-4f transitions, B is selected from among at least one or more elements other than the A in the rare-earth element group with the 4f-4f transitions, and C is selected from among at least one or more elements in a rare-earth group with 5d-4f transitions.

2. The radiation monitor according to claim 1, wherein the C in the General Formula (1) is selected from among at least one or more elements including Ce, Pr, Nd, and Tb.

3. The radiation monitor according to claim 1, wherein each of the A and the B in the General Formula (1) is selected from among at least one or more elements including Sm, Eu, Gd, Tb, and Dy.

4. The radiation monitor according to claim 1, wherein the C in the General Formula (1) is contained in the phosphor by $1\times10^{-6}$ to 30 mass % of a total mass of the phosphor.

5. The radiation monitor according to claim 1, wherein the B in the General Formula (1) is contained in the phosphor by $1\times10^{-3}$ to 30 mass % of a total mass of the phosphor.

6. The radiation monitor according to claim 1, wherein the phosphor has a damping time constant equal to or higher than 1 μs.

7. The radiation monitor according to claim 1, further comprising
   a wavelength filter that transmits the photon having a wavelength of a predetermined range and that is provided in a portion of the optical fiber between the phosphor of the radiation detection section and the photo detector, wherein
   the photo detector converts the photon transmitted through the wavelength filter into the electric pulse signal.

8. The radiation monitor according to claim 7, further comprising
   a plurality of radiation detection sections and a plurality of optical fibers.

9. The radiation monitor according to claim 8, further comprising:
   a photoselection mechanism that selects the photons transferred from one of the optical fibers; and
   a control device that is connected between the analysis section and the photoselection mechanism and that controls the photoselection mechanism.

10. The radiation monitor according to claim 9, wherein the wavelength filter is provided between at least two or more radiation detection sections and the photo detector.

11. The radiation monitor according to claim 1, wherein the radiation monitor measures dose rates within an area to be measured in such a manner that the radiation detection section is installed within the area to be measured, and the photo detector, the counter, and the analysis section are installed outside of the area to be measured.

* * * * *